Dec. 14, 1937. W. H. HALL 2,102,413
ANALEMMIC TELLURIAN GLOBE
Filed April 27, 1934 5 Sheets-Sheet 1

Inventor:-
William H. Hall.
By Wilson, Dowell, McCanna & Foley attys.

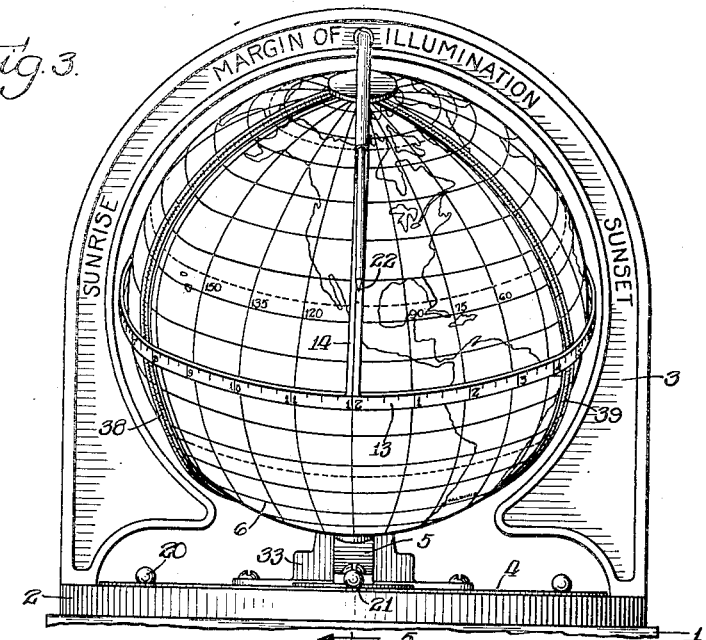
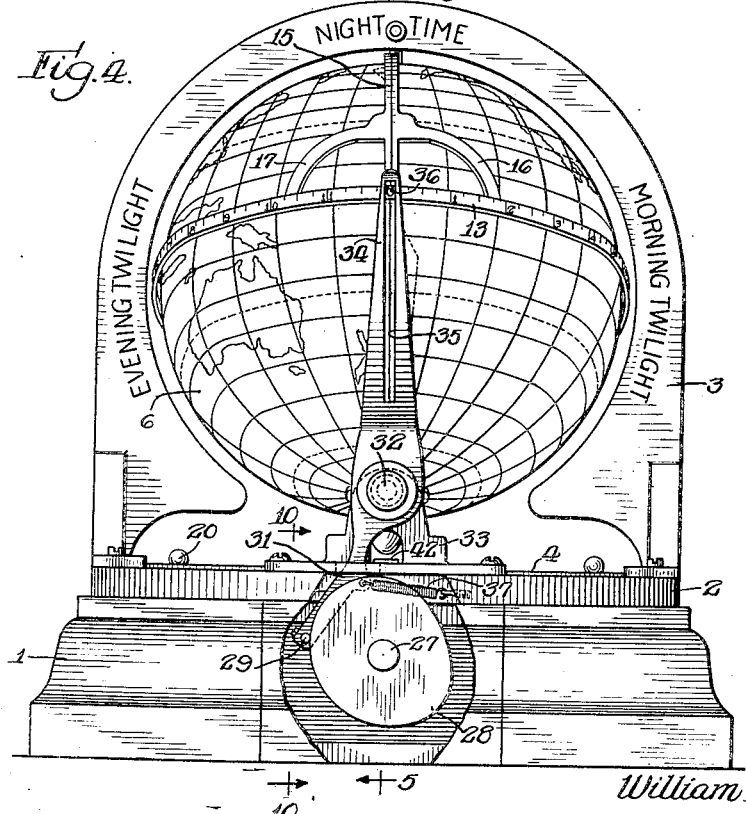

Dec. 14, 1937. W. H. HALL 2,102,413
ANALEMMIC TELLURIAN GLOBE
Filed April 27, 1934 5 Sheets-Sheet 3

Inventor:
William H. Hall,
By Wilson, Dowell, McCanna & Foley attys

Inventor:-
William H. Hall,

Dec. 14, 1937.  W. H. HALL  2,102,413
ANALEMMIC TELLURIAN GLOBE
Filed April 27, 1934  5 Sheets-Sheet 5
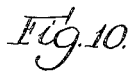
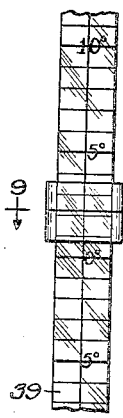
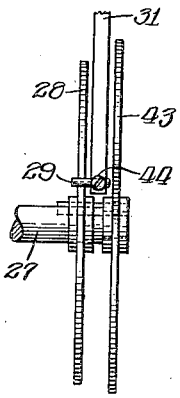
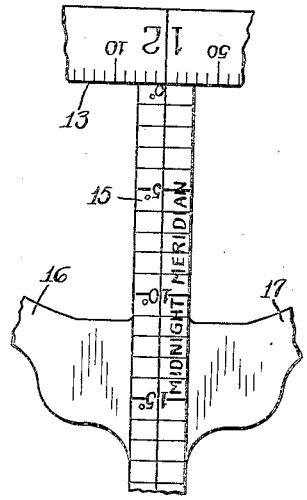
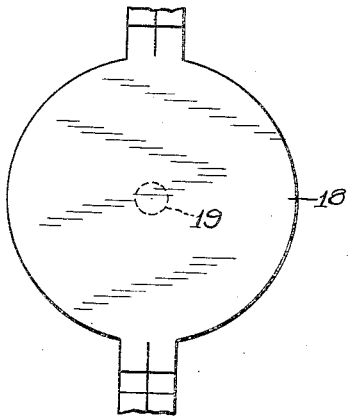
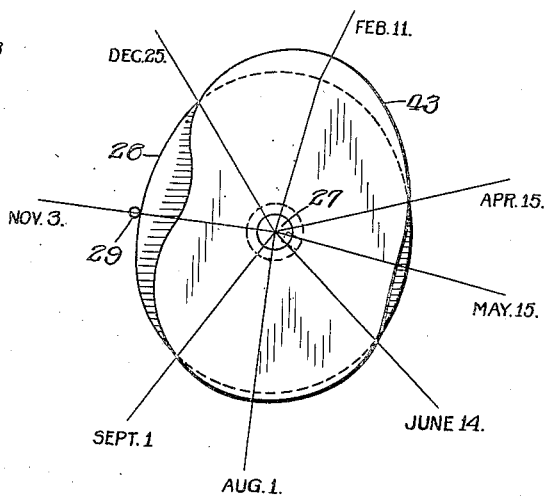
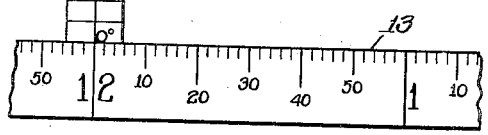
Inventor:-
William H. Hall,
By Wilson, Dowell, McCanna & Foley
Attys.

Patented Dec. 14, 1937

2,102,413

UNITED STATES PATENT OFFICE 2,102,413

ANALEMMIC TELLURIAN GLOBE

William H. Hall, Cicero, Ill.

Application April 27, 1934, Serial No. 722,616

20 Claims. (Cl. 35—46)

This invention relates to an analemmic tellurian apparatus which includes a terrestrial globe and mechanism for moving it relatively to an imaginary sun and to fixed and movable indexes for illustrating in various positions of the movement certain phenomena of the relationships existing between the sun and the earth during the diurnal rotation of the earth and its annual revolution about the sun.

This invention enables one quickly to set the apparatus to show the position of the earth in the rays of the sun on any day, hour or minute of the entire year, and, without reference to other sources of information, demonstrate, illustrate or ascertain in a plain understandable way various important and interesting phenomena such as those enumerated below.

The places of sunrise and sunset for any day and hour of the year.

The time of sunrise or sunset at any place on any day of the year.

The beginning of each day on the earth and its beginning at any place on the earth.

The advance of the new day around the world.

The areas on the earth's surface where differently named week days are existent.

The simultaneous beginning, duration and end of opposite seasons in the northern and southern hemispheres.

The amount of the equation of time for each day.

The six months day or night in the polar regions.

The duration of long and short days.

The times and places at which the "midnight sun" can be seen.

The signs of the zodiac as they occur.

The places where the sun's rays are perpendicular to the earth on any day.

Various other objects, advantages, and functions of this apparatus will be alluded to in detail in the specification, or may be readily discerned therefrom.

In the drawings:

Fig. 3 is a front elevation showing the globe moved to the position which it occupies with reference to the sun's rays on June 21st;

Fig. 4 is a rear elevation of the apparatus occupying the position shown in Fig. 3;

Fig. 8 is an enlarged detail view of a movable transparent meridian bar employed in this invention;

Fig. 9 is a sectional view on the line 9—9 of Fig. 8;

Fig. 10 is an elevation taken at the position of line 10—10 of Fig. 4, showing the mounting of a pair of cams for alternative use with the reciprocating time band as explained later;

Fig. 11 is an end elevation of a cam, with the aid of which standard time and mean solar time readings may be obtained, and a sun time cam, both keyed on the same shaft, and showing the cam follower pin at the position it should contact the standard time cam on November 3rd;

Fig. 12 is a developed view of a portion of the time band showing its preferred markings.

Figure 1:
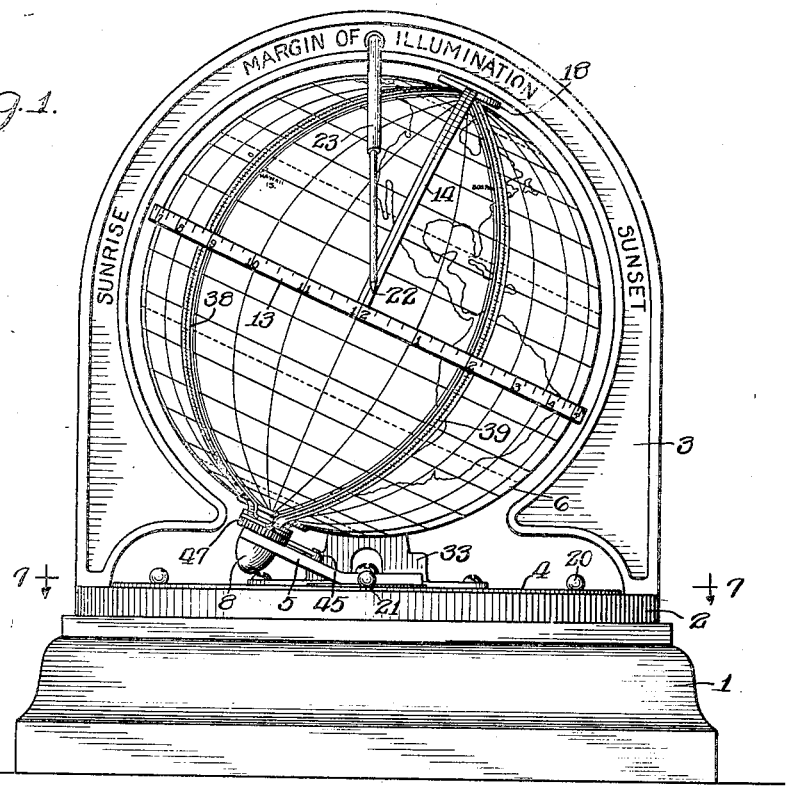
Fig. 1 is a front elevation of a tellurian globe, in accordance with this invention, showing the globe in the position which it occupies with reference to the sun's rays on March 21st.
Figure 2:
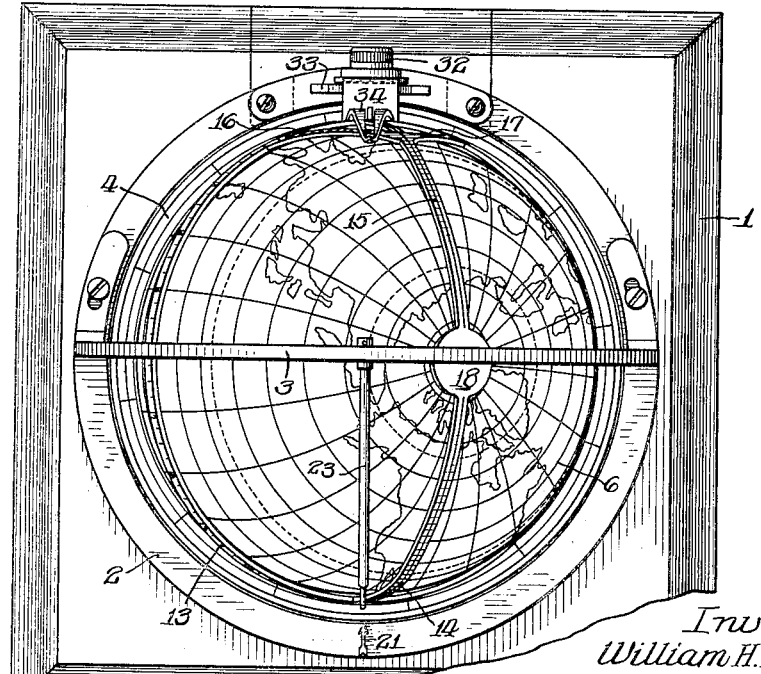
Fig. 2 is a top plan view of the same apparatus occupying the same position.
Figure 7:
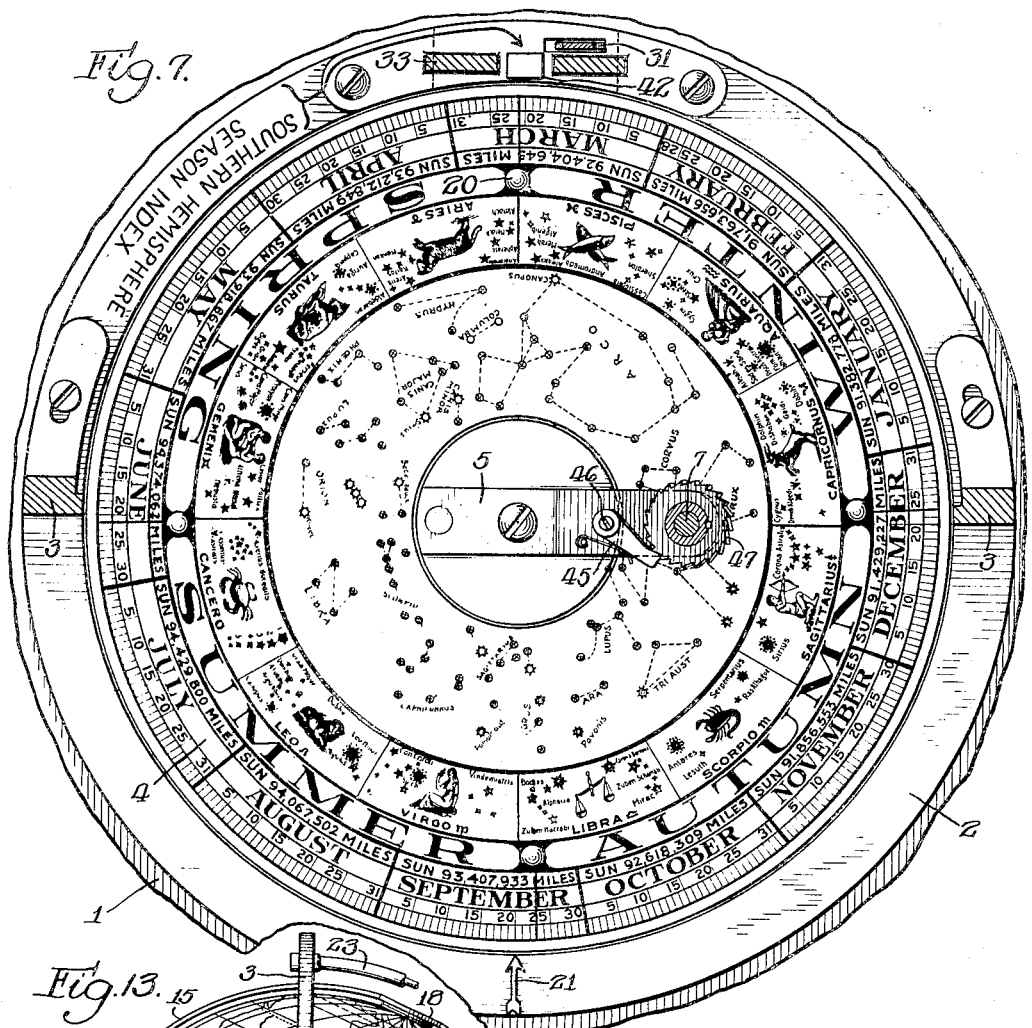
Fig. 7 is a section on the line 7—7 of Fig. 1, showing particularly the date dial of the apparatus.

In the drawings, the apparatus shown includes a base 1 for supporting the apparatus so that it may be placed upon a table top. A circular horizontal frame member 2 (see Figs. 1 and 7) affords a rigid base on which a margin of illumination arch 3 may be mounted. The front wall of this arch will be a plane surface perpendicular to the top surface of the date dial 4 and will be slightly to the rear of the center of the globe, as viewed in Fig. 1.

The reason for disposing the margin of illumination plane slightly to the rear as noted is because it is desired that a projection of this plane upon the globe will mark the dividing line between the area of the globe illuminated by the sun and that which is not illuminated. Since the sun has a much larger diameter than the earth, slightly more than one-half of the earth's surface will be illuminated. Since the day at the equator is known to be approximately 15 minutes longer than the night, all year round, the vertical plane of the margin of illumination should intersect the equatorial time band, hereinafter described, in such a way that approximately 15 more minute spaces on the band will show in front of the margin than back of it.

The date dial 4 rotates about a vertical axis and supports at its center a bracket 5 on which is mounted a globe 6. A hollow shaft 7 is threaded into the bracket 5 and a lock nut 8 rigidly secures this shaft as shown. The globe itself is a hollow spherical member and is supported at the margin of the aperture 9 on a bushing 11 which extends through the globe from the north pole thereof to the south pole thereof, surrounding the hollow shaft 7 and permitting the globe to rotate about the shaft as an axis. The bushing 11 has an enlarged head 12 affixed to the outer surface of the globe in any suitable manner to prevent the globe from rotating on its bushing.

The axis of the globe should be so mounted that it will make an angle of 23° and 27 minutes with a vertical line drawn through the center of the globe and the center of the date dial perpendicular to the latter. This duplicates the angular inclination of the earth's poles relatively to the plane of the ecliptic. The exact center of the globe will, therefore, be exactly vertically above the vertical axis of the date dial.

For the purpose of measuring and indicating time, there is suspended surrounding the globe an annular band termed a time band, generally indicated as 13, which may be transparent or may be made of solid metal, but in any event will have the twenty-four hours of the day indicated thereon chronometrically, starting with twelve midnight and being numbered thereafter 1, 2, 3, etc., to twelve noon and repeating the hour numbers again until twelve midnight.

While most of the figures of the drawings show only fifteen minute time intervals on the time band on account of the small scale of the drawing, it is preferred that two minute or one minute intervals be printed on the time band for facilitating accurate determinations as hereinafter explained. The upper edge of the time band should be mounted preferably to register with the equator on the globe. It will then preferably be supported by means of a front arm 14 rigidly connected thereto in any suitable manner, and a rear arm 15 having bifurcated ends 16 and 17, these arms joining at a plate 18 at the north pole of the globe which is provided with a pin 19 extending down inside of the hollow shaft 7 any suitable distance. This pin is mounted so that it may rotate in the shaft 7 but only in a snug manner so that the time band may be supported free of the outer surface of the globe to avoid rubbing over the usual map thereon.

Among the functions of the time band as employed in this apparatus is to make it possible to ascertain standard time and mean solar time readings for sunrise and sunset of various points of interest on the world map. In order, however, that these readings may be accurate and show the true standard or true mean solar time, it is necessary that the time band be oscillated about its axis in the shaft 7 in accordance with the equation of time for each day of the year. The oscillation of the time band about the polar axis is accomplished by and synchronized with the rotation of the date dial.

A plurality of knobs 20 protruding from the surface of the date dial facilitate the manual rotation of the dial.

The bracket 5 on which the globe is mounted will be so aligned upon the date dial that a plane vertical to the date dial passing through the north and south poles of the globe will pass through the center of the globe, the axis of the date dial and the date marking for June 21st on the dial, with the north pole inclined toward June 21st. The reason for this relative positioning of the globe upon the date dial is that on June 21st the north pole points most directly toward the sun and a plane passing through the North and South Poles of the earth perpendicular to the ecliptic would intersect the sun centrally and bisect the illuminated area of the globe.

When the date dial is so rotated that the June 21st date line registers with the point of the index arrow 21, a plane passing through the poles of the globe perpendicular to the date dial will bisect the arch 3 which marks the margin of illumination and in an extension of this plane will be located the imaginary sun.

The position of this imaginary sun relative to the margin or circle of illumination is indicated by the tip 22 of a bar 23 which is firmly secured at the upper portion of the arch 3 and depends downwardly therefrom in such a way that a horizontal ray proceeding from the imaginary sun perpendicular to the circle of illumination and perpendicular to the surface of the globe will coincide with the tip of this arm and intersect the center of the globe.

The tip 22 is employed for observing whether on any date of the year sun time is identical with, or faster or slower than standard time at the principal meridians, or mean solar time anywhere.

For example, when the April 15th date line registers with the front index 21 the tip 22, representing the vertical ray of the sun, will register with the noon meridian on the bar 14, which is a line extending along the middle of the bar intersecting the position of twelve o'clock on the time band. On that date sun time and standard clock time at the principal meridians, or mean solar time anywhere will be demonstrated by this apparatus to be identical.

The registration above described, proving that the equation of time is zero, occurs four times during the year, namely, on April 15th as above noted, June 14th, September 1st and December 25th. The above stated facts agree with the tables set forth in the American Nautical Almanac for the year 1933, published by the United States Naval Observatory at Washington, D. C.

It is preferred that the arch 3 bear on its front and rear sides the legends as shown in Fig. 3 and Fig. 4.

The dates marked upon the date dial are arcuate spaces of equal length, comprising 365 equal spaces in the entire date circle on the date dial. It will be found that a globe mounted in the manner described above and shown will assume with reference to the imaginary sun of this apparatus on any date whose date line is in register with the front indicator arrow 21, the same position that the earth actually occupies in the universe with reference to the sun's rays on the indicated date.

The manner of oscillating the time band about the polar axis will now be described with reference to the date dial, it having already been explained that the date dial and the position of the globe mounted upon the bracket are adjusted relatively to each other, to the circle of illumination, to the registry point 21 and the imaginary sun in order to reproduce certain phenomena of nature.

Figure 5:
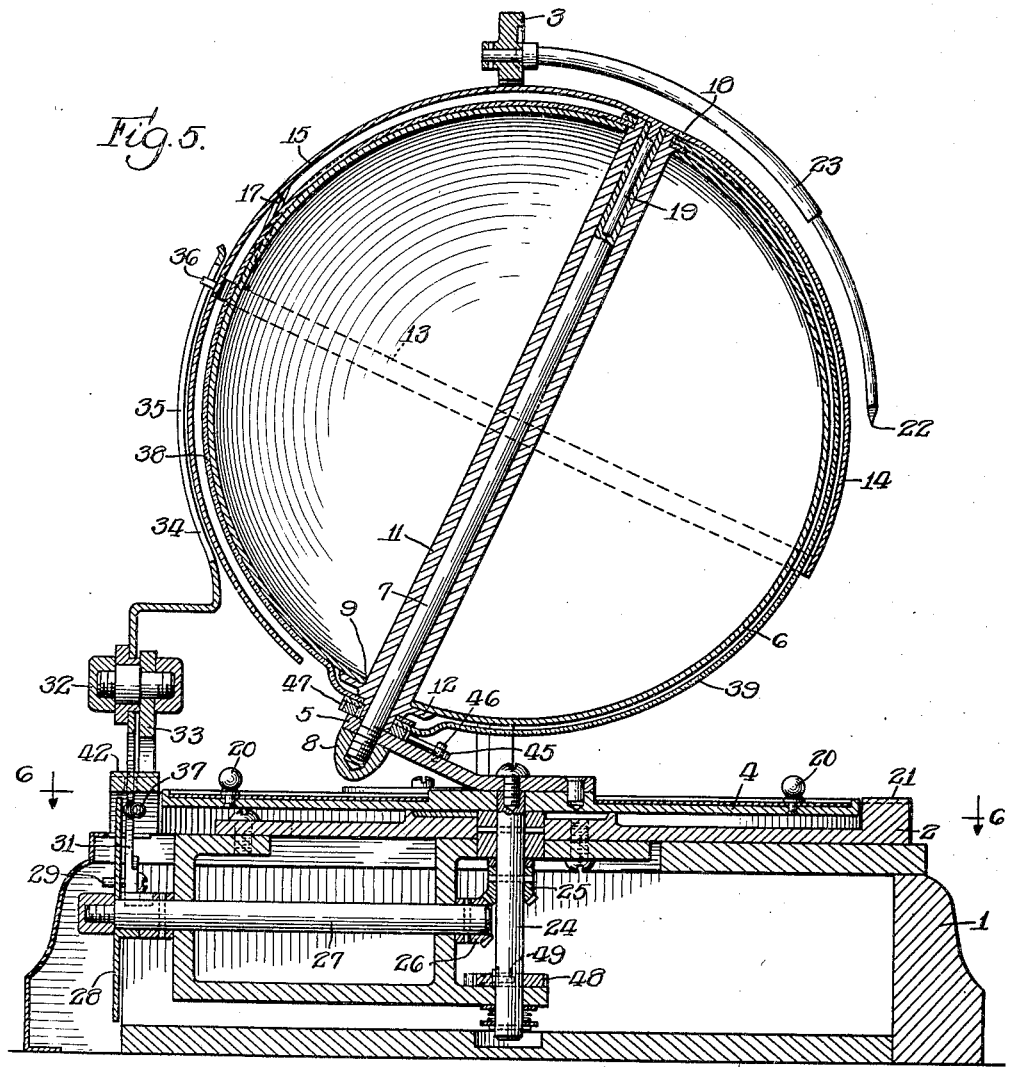
Fig. 5 is a vertical central section of the tellurian showing its operating mechanism.
Figure 6:
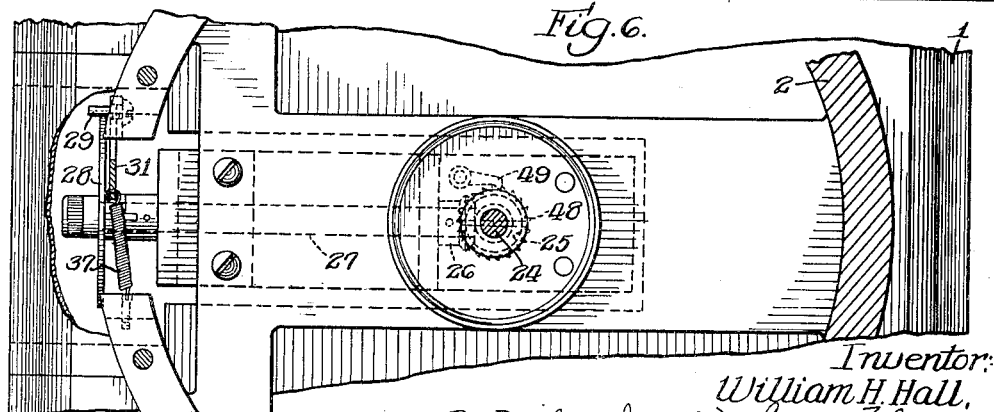
Fig. 6 is a horizontal section looking downwardly at the plane on line 6—6 of Fig. 5.

Referring now to Figs. 4, 5, and 6, it will be observed that the date dial is secured to a rotatable shaft 24 having suitable bearings in the frame of the apparatus. Keyed upon the shaft 24 is a beveled gear 25 in mesh with a beveled gear 26, the latter being keyed upon the shaft 27. At the outer end of the shaft 27, as shown in Figs. 4, 5, and 6, a cam 28 is keyed so that it may rotate with the rotation of shaft 27 in properly coordinated relation with the rotation of the date dial. There being the same number of teeth on the gears 25 and 26, one complete rotation of the date dial produces a complete revolution of the cam. The cam is shaped substantially as shown in Fig. 4. A cam follower pin 29 is fixed in the lower end of the arm 31, which is pivoted at 32 on a bracket 33 supported on the frame member 2. The upper end of this arm is formed as shown in Figs. 5 and 6, having a portion 34 paralleling the surface of the globe and provided with a narrow slot 35, in which a pin 36 fixed in the time band snugly yet freely reciprocates, as the date dial rotates. The position of the cam follower pin 29 on the cam 28, illustrated in Fig. 4, is the position which the parts have on June 21st.

The cam 28, as shown, has been designed to shift the time band on any given date in accordance with the average equation of time for that date.

A coil spring 37 connected as shown to the stationary base of the apparatus and to the arm 31 holds the cam follower pin in close contact with the periphery of the cam.

It may now be readily understood that as the date dial is rotated in either direction the eccentricity of the cam will move the cam follower pin 29 to different distances from the center of the shaft 27, causing the upper end arm 31 to rock to either side of its vertical position. At the same time the inclination of the polar axis will cause the pin 36 to slide downwardly from the position shown in Fig. 4 to various positions between the ends of the slot. As the cam causes the upper end of the arm 31 to rock, the time band will be rotated about the polar axis in such a way that when certain determinations are made, such as will now be described, the time of sunrise and the time of sunset may accurately be determined for any place on the face of the earth for any day of the year. These determinations will now be described.

Figure 13:
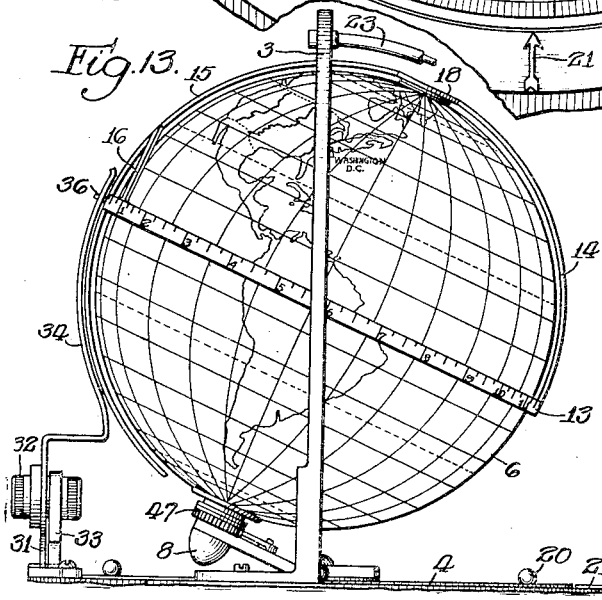
Fig. 13 is a side elevation illustrating the manner of ascertaining the time of sunrise at Washington, D. C. on June 21st.

Assuming that the standard or mean solar time cam 28 is being employed to oscillate the time band it will be remembered that the standard or clock time at any place on the earth is the standard time at the standard meridian in the standard time zone in which the particular place is located. For example, standard time at Washington, D. C. is the time taken at the 75th meridian west longitude. By placing Washington, D. C. on the globe map exactly under the sunrise margin (see Fig. 13) the intersection of the 75th meridian with the time band will denote the time (standard) at which the sun rises at sea level at Washington on the date registering with the front index 21. The figure illustrates sunrise for June 21st, which is 4:42 A. M.

Sunset time for the same day and date is ascertained by placing the city under the sunset margin, that is, exactly where the plane of the front wall of the arch intersects the globe. The time will be read where the 75th meridian intersects the time band.

The equation of time is defined as the difference between the hour angle of the true sun and of the mean sun, or stated otherwise it is the difference between true sun time and mean solar time. It has been known for many years that true sun time is not uniform, and is subject to such variation that it is impossible or at least impractical to regulate clocks or chronometers to show sun time. They can, however, be regulated to agree with the mean solar time which is therefore adopted as the basis for standard time, sometimes called civil time. Standard time is the same as mean solar time at each of the principal meridians, such as the Greenwich Meridian, the 15°, or the 75° west longitude meridians, etc. At geographical positions between the principal meridians mean solar time and standard time are not the same.

Fig. 3 shows that when June 21st on the date dial is in registry with the front indicator 21, the tip 22 is slightly to the right of the center dividing line on the bar 14. A meridian passing through tip 22 will intersect the time band at 1 minute and 28 seconds past 12 o'clock. On that day sun time is 1 minute and 28 seconds slower than mean solar time. This determines that the equation of time on June 21st is minus 1 minute 28 seconds. If on some other day a meridian passing through the tip 22 should intersect the time band at 4 minutes before 12 o'clock it would mean that the equation of time for that day is plus 4 minutes.

Of course, it will be appreciated that the accuracy with which any of these readings may be obtained will depend upon the accuracy employed in manufacturing this apparatus in accordance with the instructions given in this specification. Another factor to be considered will, of course, be the accuracy of the world map on the globe itself, it being recognized that the making of an accurate terrestrial globe is itself quite a task. The outline of the standard or mean solar time cam shown in this application has been determined as accurately as possible based upon the globe used in making the original determinations for the shape of the cam. The American Nautical Almanac, which is presumably accurate, is always available in yearly issues for comparison and may be employed to check or determine or alter the shape of the cam used in connection with the levers which oscillate the time band.

The movable meridian bands, usually a pair of them, are also provided to facilitate the reading of sunrise, sunset and the equation of time. These bands, generally indicated as 38 and 39, will have their ends pivotally connected in any suitable manner with the axis of the globe at the north and south poles. Each movable band is preferably transparent or translucent and will have a central line down its middle which leads accurately from the north to the south pole following a great circle of the globe. As shown, these points will also carry lines and markings indicating degrees of north and south latitude for convenience in ascertaining the latitude of localities on the world map.

As shown in Fig. 8, a transparent slide 41 made of celluloid or equivalent material and embracing the band as shown in Fig. 9 may be positioned on each band with a slight friction fit, but readily slidable along the band to bring it into registration with any degree of latitude the user may desire. This sliding clamp 41 will have a line dividing it horizontally so that the band and the slide may be manipulated to be placed accurately over any city or any other place of interest on the world map. The intersection of the horizontal line on the slide 41 with the margin of illumination will enable one to accurately ascertain when any city comes into the circle of illumination at the sunrise position or passes out of it at the sunset position. Following the middle line of the movable meridian band from any city down to the time band will enable one to ascertain accurately the position of the city relatively to the time band. The longitude of any city is easily determined by the movable band whether or not the globe carries the longitude degree markings. If one will ascertain the time in minutes that the meridian through the city intersects the time band before or after the time reading at the nearest standard meridian the difference in degrees of longitude of the two meridians will be the difference in minutes divided by four. Also when the sun time cam, later described, is used the movable meridian placed on any city will indicate directly on the time band the exact sun time for that place.

Directly opposite the front indicator arrow 21 will be located another indicator 42 which may be referred to if one desires to know when any season of the year begins in the Southern Hemisphere. This indicator point is of necessity wider than the front indicator due to the fact that the seasons in the Southern Hemisphere are generally deemed to begin approximately at the time an opposite season begins in the Northern Hemisphere. The parting line between these seasons is indicated on the date dial shown in Fig. 7. However, in ascertaining the beginning and ending of these seasons one should note that whereas September 23rd marks the beginning of the autumn season in the Northern Hemisphere (see Fig. 7), the same month and date marks approximately the beginning of the spring season in the Southern Hemisphere. It is not the March date which appears beside the indicator 42 which marks the beginning of the spring season in the Southern Hemisphere.

Since it may be of particular interest to some users, such as educational institutions, to be able to show and determine the sun time for various places on the globe, I have provided a cam especially designed for that purpose to be used in place of the standard or mean solar time cam 28 which Fig. 4 shows. In Fig. 10 there is shown a cam 43 which may be keyed upon the shaft 27. The lever 31 will be provided with a set screw 44 which will enable one to set the cam follower pin 29 either to the left or to the right so that it may follow either but not both of the cams. As the use of this cam 43 is optional, it is not shown in Fig. 4. However, in Fig. 11 the cam 43 is shown mounted on the shaft 27 along with the cam 28, both being keyed on the shaft and occupying the positions relatively to each other which are necessary to enable one to shift the cam follower pin from one cam to the other and ascertain accurately standard at the principal meridians or sun time as desired.

For an apparatus made in accordance with these drawings the cam 43 will have approximately the shape shown in Fig. 11, if the apparatus be manufactured and assembled accurately. When sun time cam 43 is used, the time reading at any place on the globe will be computed as the hour angle at the meridian through such place, and not the hour angle at any adjoining standard meridian. Hence the juncture with the time band of one of the movable meridians coinciding with the place will denote the time measured as sun time occuring at the place at the existing position of the globe. The contour of the sun time cam may be checked for accuracy by comparing the sun time readings with the aforesaid almanac tables.

It will be noted upon reference to Fig. 11 that the contours of the two cams intersect one another four times during the year, namely, on April 15th as indicated, June 14th, September 1st and December 25th. It is on these days that the equation of time is zero, that is, sun time and mean solar time are the same.

In Fig. 11 the differences between the two cams on a few dates are indicated, such as the February 11th date when the equation of time is minus 14 minutes and 22 seconds, the May 15th date when the equation of time is plus 3 minutes and 48 seconds, the August 1st date when the equation of time is minus 6 minutes and 11 seconds, and November 3rd when the equation of time is plus 16 minutes and 22 seconds.

When the standard of mean solar time cam is employed for causing the time band to oscillate about the polar axis, it may be observed that the pin 36 describes a path in space which is substantially that of the analemma curve which is often found on terrestrial globes.

Some of the users of this invention may desire to have a ratchet to control the rotation of the globe so that it may move only from west to east. I have accordingly shown, therefore, in Fig. 5 a ratchet pawl 45 pivoted at 46 to engage teeth on a ratchet wheel 47 keyed on the bushing 11. Any suitable spring may be used to hold this ratchet pawl 45 in engagement with the teeth. Of course, this ratchet may also be disengaged temporarily or permanently if desired. Also it may be desired by some of the users of this invention to employ a ratchet and pawl mechanism on the shaft 24 so that the date dial may be rotated only in a chronometrical movement from the first of January around to December 31st. Hence, a ratchet wheel 48 is shown splined on the shaft 24 and a pawl 49 engages therewith to insure only the desired direction of rotation. The use of this ratchet is, of course, optional.

This apparatus provides the following indexes. The front index 21 points to the day of the year on the date dial at which the earth occupies the position in the universe relative to the sun's rays that the globe in this apparatus does with reference to the imaginary sun on that date. Index 21 also points to the sign of zodiac in existence on the particular day in registry with the arrow.

The index 21 on any date in registry with it points to the season band on the date dial for the existing season in the Northern Hemisphere and also indicates how far in that season the Northern Hemisphere has advanced.

The registering of the rear fixed index 42 with the season marking on the date dial will denote what season and what portion of the season is in existence in the Southern Hemisphere on the day which simultaneously is in register with the front index 21.

The sunset and sunrise portions of the margins of the illumination are fixed indexes which indicate where the sun appears to be rising or setting, as viewed from the earth.

The tip 22 marking the point where the vertical ray of the sun strikes the earth's surface, is a fixed index by means of which the equation of time may be computed on any day of the year, as explained heretofore.

The tip 22 also is a fixed index for indicating the declination of the sun on any date in register with the front index arrow 21. On any given date, the degrees of latitude of the parallel on the earth which lies perpendicularly under the tip 22 will be the degrees of declination of the sun for that day. When the tip is north of the equator the declination is expressed with the plus sign before the number of degrees.

When the sun time cam is used in place of the standard or mean solar time cam 28, different time observations of course must be then made by means of the apparatus. There will be no equation of time indicated by the apparatus, as the tip 22 will always register with the noon meridian. Since the sun time cam will be employed for ascertaining sun time directly, standard time zones will be ignored, and the time at any place on the globe will be ascertained by the intersection of its own meridian with the time band. When the standard or mean solar time cam is employed, however, the intersection of the standard meridian in the zone of the particular place denotes the clock time at that place.

The noon meridian, which is the term applied to the bar 14 supporting the time band, is a movable index whose registry with the world map standard meridians shows the relative position of the earth when it is noon, clock time, in the standard time zone in which the respective meridian is located.

The center line of the midnight meridian band 15 at the rear of the margin of illumination is a movable index whose registry with the standard meridians shows the relative position of the earth when it is midnight in the standard time zone for each respective standard meridian.

This midnight meridian also, when the international date line marked on the globe passes under it during the diurnal rotation of the globe, shows the instant that the new day begins. By reference to the time band one can determine what time it is everywhere else on the globe at the instant a new day is born.

The midnight meridian, with the aid of the international date line indicates what area of the globe is having its time determined in accordance with the new day and what area is still reading time by the old day. Viewing the apparatus from the rear, one notes that the area from the midnight meridian toward the right as far as the international date line is advancing in the new day, while the area left of the midnight meridian as far around as the international date line is still in the old day. This midnight index is of course movable with the time band.

The margin of illumination also serves as a fixed index to indicate what portion of the earth is not exposed to the sun's rays.

The margin of illumination is also a fixed index which on every date registering with the front index 21 shows and measures the difference in extent between the day and the night at every latitude on the earth's surface. For example, it shows that on June 21st while the day at the equator is about 14 minutes longer than the night, the day at the 40° north latitude is about 6 hours longer than the night.

The top of the arch of the margin of illumination is a fixed index which readily illustrates and measures the length of the days and nights in the polar regions, showing the days of the year when the sun shines on the arctic circle or the antarctic circle, or points within these circles, during the entire twenty-four hours of the day. By the same index one can ascertain the days when the sun does not shine within the arctic or antarctic circle.

In order properly and accurately to locate the arch 3 with reference to the globe, the plane of the margin of illumination should be perpendicular, as noted heretofore, to the vertical ray of the imaginary sun, and should so intersect the globe as to divide its equator into two parts of approximately 178°—7½ minutes and 181°—52½ minutes. The larger portion should be in front of the margin of illumination. It is known that the "circle of illumination" by the real sun in the same manner intersects the earth's equator, with the larger portion of the earth illuminated. If the time band be utilized as described heretofore it will show that the day (period of direct illumination) at the equator will average approximately 15 minutes longer than the night (period of no direct illumination).

Therefore, the average day at the equator will be approximately 12 hours and 7½ minutes long and the average night will be approximately 11 hours and 52½ minutes long. That this average difference between day and night at the equator is actually demonstrated by this invention is readily ascertained by looking at the time band, which will show 12 hours and 7½ minutes approximately in front of the plane of the arch 3 and 11 hours and 52½ minutes back of the same plane.

In the universe the sun's rays envelop slightly more than half of the earth and the margin of the illuminated area is commonly termed by scientists "the circle of illumination". This term with this meaning is adopted in this specification and in the claims.

Scientists term as the "vertical ray" of the real sun that ray which strikes the earth's surface perpendicularly. In this apparatus the "vertical ray" of the imaginary sun passes through the tip 22, strikes the globe perpendicularly to its surface and intersects both the center of the globe and the center of the margin of illumination.

All the time computations made with the aid of this apparatus are computed at sea level. Altitude of the land and irregularities in its surface are ignored.

It should be understood that the embodiment herewith shown and described is the form of the invention at present preferred, but that the scope of the invention is not limited to the precise details of construction herein shown but is to be ascertained by reference to the appended claims.

Having shown and described my invention, I claim:

1. In a tellurian apparatus, a terrestrial globe, meridian indicating means on the globe, means for mounting the globe for rotation about its polar axis, means supporting said globe and its mounting for rotation about a vertical axis intersecting the center of the globe and the axis of the globe at an angle of 23°—27 minutes, a stationary arch surrounding the greater portion of the globe having a margin whose plane so intersects the equator of the globe as to divide it into two parts of approximately 178°—7½ minutes and 181°—52½ minutes, a time band mounted for oscillation bearing hour indicia encircling the globe in a plane parallel to its equator, and means for positioning said band relatively to the arch to show correctly the mean solar time hour angles for the meridians of the globe for any position of the globe's polar axis relatively to the plane of said arch.

2. In a tellurian apparatus, a terrestrial globe, meridian indicating means on the globe, means for mounting the globe for rotation about its polar axis, means supporting said globe and its mounting for rotation about a vertical axis intersecting the center of the globe and the axis of the globe at an angle of 23°—27 minutes, a stationary arch surrounding the greater portion of the globe having a margin whose plane so intersects the equator of the globe as to divide it into two parts of approximately 178°—7½ minutes and 181°—52½ minutes, a stationary index, means bearing chronometrical indicia of the days of the year operatively connected and coordinated with said supporting means for indicating at the position of said index the days of the year on which the earth occupies corresponding positions in the sun's rays that said globe occupies with reference to an imaginary sun at one side of said arch, a time band mounted for oscillation bearing hour indicia encircling the globe in a plane parallel to its equator, and means for positioning said band relatively to said arch for showing correctly the mean solar time hour angles of the meridians on any date registering with said index.

3. In a tellurian apparatus, a terrestrial globe, meridian indicating means on the globe, means for mounting said globe for rotation about its polar axis, means for supporting said mounting to incline the globe 23°—27 minutes from its vertical center line, said supporting means being constructed for rotating said mounting and the globe about a vertical axis passing through the center of the globe, a stationary arch surrounding the greater portion of said globe having a plane parallel to said vertical axis of rotation intersecting the equator of the globe to divide it into two parts of approximately 178°—7½ minutes and 181°—52½ minutes, a stationary index, movable means bearing the daily dates of the year coordinated with the movement of said mounting means about said vertical axis to bring into register with said index correctly the daily date on which the earth occupies the same position with reference to the sun's circle of illumination that the globe in this apparatus occupies with reference to said plane of said arch, a time band mounted for oscillation bearing hour indicia encircling the globe in a plane parallel to its equator, and means for positioning said band relatively to said arch for showing correctly the mean solar time hour angles of the meridians on any date registering with said index.

4. In a tellurian apparatus, a circular dial mounted for rotation about a vertical axis and bearing in chronometrical arrangement markings indicating the days of the year, a terrestrial globe mounted on the dial to move bodily therewith with its center intersected by said axis and mounted on the dial to rotate on a polar axis inclined 23°—27 minutes to said vertical axis, said globe having meridian indicating means thereon, a stationary vertical arch surrounding the greater portion of the globe positioned in simulation of the "circle of illumination" made by the sun upon the earth, a fixed index, the day markings on said dial being coordinated with the position of the globe on the dial whereby upon registry of any date with said index the polar axis will assume the position with reference to said arch that the earth on that date has with reference to the "circle of illumination", a time band encircling the globe parallel to its equator bearing hourly indicia and mounted for oscillation, and means for positioning said globe relatively to said arch to show correctly the hour angles of the meridians on any date registering with said index.

5. In a tellurian apparatus, a circular dial mounted for rotation about a vertical axis and bearing in chronometrical arrangement markings indicating the days of the year, a terrestrial globe mounted with its center intersected by said axis and mounted on the dial for diurnal rotation with its polar axis inclined 23°—27 minutes to said vertical axis in a vertical plane intersecting the June 21st marking on the dial, a stationary arch surrounding the greater portion of the globe positioned in simulation of the circle of illumination made by the sun upon the earth, a band marked with 24 hourly divisions thereon supported on said globe for oscillation about the axis of said globe and extended about the globe parallel to its equator, and a fixed index with which said dial markings are successively registerable.

6. In a tellurian apparatus, a circular dial mounted for rotation about a vertical axis and bearing in chronometrical arrangement markings indicating the days of the year, a stationary index, a terrestrial globe mounted on the dial with its center intersected by said axis and mounted for diurnal rotation with its polar axis inclined 23°—27 minutes to said vertical axis, a stationary arch surrounding the greater portion of the globe positioned in simulation of the circle of illumination made by the sun upon the earth, a band marked with 24 hourly divisions thereon supported on said globe for oscillation about the polar axis of said globe extending parallel to its equator, and means for oscillating said band about said polar axis whereby the intersection of a standard time meridian on the globe with the sunrise margin of said arch on any day of the year whose date is in registry with said index and the intersection of the same meridian with the time band will indicate correctly the standard time of sunrise at said first intersection.

7. In a tellurian apparatus, a terrestrial globe, means for mounting the globe for rotation about its polar axis at an inclination from the vertical simulating the earth's inclination to the ecliptic and for further bodily revolution about a vertical axis intersecting the globe's center, a time band surrounding the globe parallel to its equator bearing hour indicia and mounted for oscillation about the polar axis, and a stationary vertical arch surrounding the greater portion of the globe positioned with respect thereto and to an imaginary sun on a line perpendicular to the center of the plane of said arch indicating the position of the circle of illumination made by the sun upon the earth, means operatively connected with the means for bodily revolving the globe about its vertical axis including an index and indicia representing the days of the year arranged for indicating correctly the date on which the earth's polar axis occupies the position in the sun's rays corresponding to the position then occupied by the globe's polar axis with reference to said imaginary sun at any position of bodily revolution of said globe, said arch having a margin providing a vertical plane intersecting the equator of the globe dividing the same into two parts of approximately 178°—7½ minutes and 181°—52½ minutes with the larger portion nearer the imaginary sun.

8. In a tellurian apparatus, a terrestrial globe, meridian indicating means on the globe, a time band bearing hour indicia encircling the globe in a plane parallel to the earth's equator, means for mounting the globe for rotation about its polar axis at an inclination from the vertical simulating the earth's inclination to the ecliptic and for further bodily revolution about a vertical axis intersecting the globe's center, a stationary vertical arch surrounding the greater portion of the globe positioned with respect thereto and to an imaginary sun on a line perpendicular to the center of the plane of said arch indicating the position of the circle of illumination made by the sun upon the earth, said arch providing a margin whose vertical plane intersects the equator of the globe to divide it into two parts of approximately 178°—7½ minutes and 181°—52½ minutes with the larger portion nearer to the imaginary sun, a stationary index, means bearing chronometrically arranged markings for the daily dates of the year operatively connected with and coordinated with said means for revolving the globe to cause the registry of said index with any of said markings to point correctly to the date on which the earth occupies the position relative to the circle of illumination made by the sun that said globe does on said date with reference to said arch, and means for positioning said time band relatively to the arch to show correctly the mean solar time hour angles of the meridians at any position of the globe's polar axis relatively to said arch.

9. In a tellurian apparatus, a terrestrial globe, means for mounting the globe for diurnal rotation about its polar axis with said axis inclined 23°—27 minutes from its vertical center line and for annual revolution about said center line as an axis, a margin of illumination indicator surrounding the greater portion of the globe positioned to indicate and simulate the position of the "circle of illumination" upon the earth, said indicator having a vertical plane surface whose plane intersects the globe's equator to divide the same into two parts approximately of 178°—7½ minutes and 181°—52½ minutes, a stationary index, movable means bearing daily date indicia for the year coordinated with the mounting means and the annual revolution of said globe and with said index whereby the positioning of any date in register with said index will simultaneously position the globe with reference to its margin of illumination identically with the actual position of the earth in its "circle of illumination" on that date, a time band surrounding the globe parallel to its equator and bearing hour indicia, and means for positioning said band relatively to said arch to show correctly the hour angles of the meridians at any position of the globe relatively to said arch.

10. In a tellurian apparatus, a terrestrial globe, meridian indicating means on the globe, means for mounting the globe for diurnal rotation about its polar axis with said axis inclined 23°—27 minutes from its vertical center line and for annual revolution about said center line as an axis, a margin of illumination indicator surrounding the greater portion of the globe positioned to indicate and simulate the position of the "circle of illumination" upon the earth, a stationary index, movable means bearing daily date indicia for the year coordinated with the mounting means and the annual revolution of said globe and with said index whereby the positioning of any date in register with said index will simultaneously position the globe with reference to its margin of illumination identically with the actual position of the earth in its "circle of illumination" on that date, and a time band marked with 24 hourly divisions thereon supported on said globe for oscillation about its polar axis and extending parallel to its equator.

11. In a tellurian apparatus, a terrestrial globe, meridian indicating means on the globe, means for mounting the globe for diurnal rotation about its polar axis with said axis inclined 23°—27 minutes from its vertical center line and for annual revolution about said center line as an axis, a margin of illumination indicator surrounding the greater portion of the globe positioned to indicate and simulate the position of the "circle of illumination" upon the earth, a stationary index, movable means bearing daily date indicia for the year coordinated with the mounting means and the annual revolution of said globe and with said index whereby the positioning of any date in register with said index will simultaneously position the globe with reference to its margin of illumination identically with the actual position of the earth in its "circle of illumination" on that date, a time band marked with 24 hourly divisions thereon supported on said globe for oscillation about its polar axis and extending parallel to its equator, and means coordinated with said annual revolution of the globe for oscillating said band whereby said time band will correctly show the mean solar time hour angles for the meridians of the globe on all dates in register with said index.

12. In a tellurian apparatus, a terrestrial globe, meridian indicating means on the globe, means for mounting the globe for diurnal rotation about its polar axis with said axis inclined 23°—27 minutes from its vertical center line and for annual revolution about said center line as an axis, a margin of illumination indicator surrounding the greater portion of the globe positioned to indicate and simulate the position of the "circle of illumination" upon the earth, a stationary index, movable means bearing daily date indicia for the year coordinated with the mounting means and the annual revolution of said globe and with said index whereby the positioning of any date in register with said index will simultaneously position the globe with reference to its margin of illumination identically with the actual position of the earth in its "circle of illumination" on that date, a time band marked with 24 hourly divisions thereon supported on said globe for oscillation about its polar axis and extending parallel to its equator, and means cooperating with said time band and coordinated with the positions of the globe in its said annual revolution for positioning said time band to show correctly the mean solar time hour angles for the meridians of the globe on all dates registering with said index.

13. In a tellurian apparatus, a terrestrial globe, means for mounting the globe for diurnal rotation about its polar axis with said axis inclined 23°—27 minutes from its vertical center line and for annual revolution about said center line as an axis, a margin of illumination indicator surrounding the greater portion of the globe positioned to indicate and simulate the position of the "circle of illumination" upon the earth, a stationary index, movable means bearing daily date indicia for the year coordinated with the mounting means and the annual revolution of said globe and with said index whereby the positioning of any date in register with said index will simultaneously position the globe with reference to its margin of illumination identically with the actual position of the earth in its "circle of illumination" on that date, a time band marked with 24 hourly divisions thereon supported on said globe for oscillation about its polar axis and extending parallel to its equator, said indicator having a marginal surface whose vertical plane divides the equator into two parts of 178°—7½ minutes and 181°—52½ minutes with the larger portion in the area of illumination, means cooperating with said time band and coordinated with the positions of the globe in its said annual revolution for positioning said time band to show correctly the mean solar time hour angles for the meridians of the globe on any date registering with said index, and a member adapted to be positioned on a line perpendicular to the plane of said margin for indicating the path of the vertical ray of an imaginary sun assumed to produce said margin of illumination.

14. In a tellurian apparatus, a terrestrial globe, meridian indicating means on the globe, means for mounting the globe for rotation about its polar axis, means supporting said globe and its mounting for rotation about a vertical axis intersecting the center of the globe and the polar axis of the globe at an angle of 23°—27 minutes, a stationary arch surrounding the greater portion of the globe having a margin whose plane so intersects the equator of the globe as to divide it into two parts approximately of 178°—7½ minutes and 181°—52½ minutes, a time band bearing hour indicia encircling the globe in a plane parallel to the globe's equator, and a vertical ray indicator mounted adjacent the globe's surface on a line horizontally extending through the globe's center perpendicularly to said plane, said indicator being adjacent the larger portion of the globe as determined by said intersection.

15. In a tellurian apparatus, a terrestrial globe, means supporting the globe with its polar axis inclined 23°—27 minutes from the vertical line extending through its center, means for rotating said supporting means about a vertical axis extending through the center of the globe, a time band bearing hour indicia encircling the globe in a plane perpendicular to the globe's polar axis and mounted for oscillation in said plane, and means operatively connected and adjusted with said rotating means for oscillating said band to show correctly the hour angles of the globe's meridians in all positions during said rotation with reference to an imaginary sun lying on a horizontal line extending through the center of the globe.

16. In a tellurian apparatus, a circular date dial bearing daily date indicia for the year mounted for rotation about a central vertical axis, a terrestrial globe supported on said dial with its center intersected by the axis of the dial and mounted for rotation on its polar axis with the latter inclined 23°—27 minutes from said vertical axis, the mounting for said globe being fixed on said dial, means partially surrounding the globe having a margin lying in a vertical plane intersecting the equator of the globe to divide the same into two parts approximately of 178°—7½ minutes and 181°—52½ minutes, a fixed index with which the day markings on said dial may be rotated into registration, the globe being mounted on the dial so that a vertical plane passing through its polar axis will intersect the June 21st marking on said dial, a time band encircling the globe in a plane perpendicular to the polar axis bearing twenty-four equal hourly markings thereon and mounted for oscillation in said plane, and means operated by and coordinated with the rotation of said dial for oscillating said band to show correctly the hour angles of the globe's meridians upon any date in registration with said index.

17. In a tellurian apparatus, a terrestrial globe, means supporting the globe with its polar axis inclined 23°—27 minutes from the vertical line extending through its center, said means being rotatable about said vertical line as an axis, a time band encircling the globe in a plane perpendicular to the globe's polar axis and mounted for oscillation in said plane and bearing markings indicating the twenty-four hours of the day, and means for oscillating said band operatively connected and synchronized with said supporting means for rotation therewith including a cam and a bell crank oscillated by said cam, said crank having a vertical slot, said band having a pin riding in said slot, said oscillating means being constructed and arranged to oscillate the band to show correctly the hour angles of the globe's meridians in all positions of the "annual" rotation of the globe with reference to an imaginary sun lying on a horizontal line extending through the center of the globe.

18. In a tellurian apparatus, a terrestrial globe, means supporting the globe with its polar axis inclined 23°—27 minutes from the vertical line extending through its center, means for rotating said supporting means about a vertical axis extending through the center of the globe, a time band bearing hour indicia encircling the globe and mounted for oscillation in a plane perpendicular to the polar axis, and means cooperable with said time band for determining the correct position of the time band with reference to an imaginary "circle of illumination" in any position of the polar axis of the globe relative to said circle.

19. In a tellurian apparatus, a terrestrial globe, means supporting the globe with its polar axis inclined 23°—27 minutes from the vertical line extending through its center, said supporting means being rotatable about a vertical axis extending through the center of the globe, means mounted adjacent the globe for indicating correctly the position of the "circle of illumination" made by an imaginary sun positioned at one side of the center of said globe, a time band surrounding the globe parallel to its equator and bearing hour indicia, and means operated by said supporting means during its rotation for oscillating said time band in accordance with the equation of time for showing correctly on the time band the mean solar time hour angles of the globe's meridians in all positions of its rotation about said vertical axis.

20. In a tellurian apparatus, a terrestrial globe, means supporting the globe with its polar axis inclined 23°—27 minutes from the vertical line extending through its center, said supporting means being rotatable about a vertical axis extending through the center of the globe, means mounted adjacent the globe for indicating correctly the position of the "circle of illumination" made by an imaginary sun positioned at one side of the center of said globe, and a time band surrounding the globe parallel to its equator and bearing hour indicia and mounted for oscillation about the polar axis.

WILLIAM H. HALL.